United States Patent
Maekawa et al.

(10) Patent No.: US 8,226,531 B2
(45) Date of Patent: Jul. 24, 2012

(54) ACCELERATION SHOCK REDUCTION APPARATUS FOR VEHICLE

(75) Inventors: Takuya Maekawa, Atsugi (JP); Masahiro Iriyama, Atsugi (JP)

(73) Assignee: Nissan Motor Co., Ltd., Kanagawa (JP)

( * ) Notice: Subject to any disclaimer, the term of this patent is extended or adjusted under 35 U.S.C. 154(b) by 1027 days.

(21) Appl. No.: 12/184,838

(22) Filed: Aug. 1, 2008

(65) Prior Publication Data

US 2009/0054205 A1 Feb. 26, 2009

(30) Foreign Application Priority Data

Aug. 21, 2007 (JP) .................................. 2007-214369

(51) Int. Cl.
 *B60W 10/04* (2006.01)
 *B60W 10/10* (2006.01)
(52) U.S. Cl. ........................ 477/110; 477/107; 477/111
(58) Field of Classification Search .................. 477/107, 477/109, 110, 111
See application file for complete search history.

(56) References Cited

U.S. PATENT DOCUMENTS

| | | | |
|---|---|---|---|
| 7,096,099 B2 * | 8/2006 | Itoh et al. | 701/22 |
| 7,134,982 B2 * | 11/2006 | Ozeki et al. | 477/3 |
| 7,282,010 B2 * | 10/2007 | Iriyama et al. | 477/107 |
| 7,713,163 B2 * | 5/2010 | Hayashi et al. | 477/3 |

FOREIGN PATENT DOCUMENTS

| | | |
|---|---|---|
| EP | 1124049 | 8/2001 |
| EP | 1647741 | 4/2006 |
| JP | 2000-130219 A | 5/2000 |
| JP | 2000-229526 A | 8/2000 |
| JP | 2001-065379 A | 3/2001 |
| JP | 2004001761 | 1/2004 |
| JP | 2004-150388 | 5/2004 |
| JP | 2004-183615 A | 7/2004 |
| JP | 2007-091193 A | 4/2007 |

OTHER PUBLICATIONS

Office Action in Japanese Patent Application No. 2007-214369 dated Dec. 8, 2009 and English translation thereof (6 pages).
English Patent Abstract of JP2001065379 from esp@cenet, published Mar. 13, 2011 (1 page).
English Patent Abstract of JP200130219 from esp@cenet, published May 9, 2000 (1 page).
English Patent Abstract of JP2004183615 from esp@cenet, published Jul. 2, 2004 (1 page).
English Patent Abstract of JP2007091193 from esp@cenet, published Apr. 12, 2007 (1 page). Sep. 21, 2010 (4 pages).
Office Action in European Application No. 08161811.8-1264, dated European Search Report for European Application No. 08161811.8-1264, dated Feb. 5, 2009 (7 pages).
Office Action in Japanese Patent Application No. 2007-214369 dated May 18, 2010 (2 pages).
English Patent Abstract of JP2000229526 from esp@cenet, published Aug. 22, 2000 (1 page).

* cited by examiner

*Primary Examiner* — Ha D. Ho
(74) *Attorney, Agent, or Firm* — Osha Liang LLP

(57) ABSTRACT

A vehicle control system includes a prime mover, a power transmission apparatus disposed between the prime mover and at least one wheel, an engaging element configured to selectively engage and disengage the prime mover from the at least one wheel, and a torque limiter configured to restrict an output torque of the prime mover to a selected percentage when in transition between an unloaded state and a loaded state, wherein the torque limiter is configured to restrict the output torque of the prime mover while the engaging element is disengaged between the prime mover and the power transmission apparatus.

16 Claims, 12 Drawing Sheets

| Shift stage \ Frictional shift elements | I/C | H&LR /C | D/C | R/B | Fr/B | LC/B | FWD /B | 1st/ OWC | 3rd/ OWC | FWD/ OWC |
|---|---|---|---|---|---|---|---|---|---|---|
| 1st shift | | ● | | | ● | ● | ○ | ○ | ○ | ○ |
| 2nd shift | | ↑ | ○ | | ● | ● | ○↑ | | ○ | ○↑ |
| 3rd shift | | ○ | ○ | | ● | | | | ○ | |
| 4th shift | ○ | ○ | ○ | | | | ○ | | | |
| 5th shift | ○ | ○ | | | ○ | | ○ | | | |
| Reverse | | ● | | ○ | ● | | | ○ | ○ | |

ACCELERATION SHOCK REDUCTION APPARATUS FOR VEHICLE

CROSS-REFERENCE TO RELATED APPLICATIONS

The present application claims priority from Japanese Patent Application No. 2007-214369, filed Aug. 21, 2007. The contents of the priority application are hereby incorporated by reference in their entirety.

BACKGROUND OF THE DISCLOSURE

1. Field of the Disclosure

The present disclosure relates to an acceleration shock reduction apparatus for vehicles that may be driven by power transmitted from a prime mover such as (e.g., an internal combustion engine, etc.) to wheels via a transmission. Furthermore, the present disclosure relates to an acceleration shock reduction apparatus wherein an output of the prime mover may be varied (e.g., dampened, modulated, etc.) from a requested demand input.

2. Description of the Related Art

With market demands for high performance vehicles, prime movers (e.g., internal combustion engines, electric motors, hybrid drives, etc.) having improved torque response to accelerator pedal manipulation are desirable. Thus, a variety of power trains capable of meeting demands for improved torque response have been proposed.

Assignees of the present disclosure have also proposed an internal combustion engine including a variable valve mechanism capable of regulating engine intake by controlling an operation angle and a lift amount of an intake valve to achieve improved torque response characteristics.

When a transmission system, (i.e., a series of mechanisms for transmitting power from the prime mover to the wheels) is in a non-rigid coupling state, the transmission system operates as follows upon manipulating the prime mover from an unloaded state provided by releasing an accelerator pedal to a loaded state provided by depressing the accelerator pedal.

When torque transfer characteristics of the engaging element (e.g., torque transfer capacities of the engaging element) are abruptly changed during an engagement process of the engaging element, acceleration shock may occur in connection with acceleration resulting from depressing the accelerator pedal. In a vehicle having a prime mover exhibiting excellent torque response characteristics as described above, the acceleration shock may be substantial due to the high torque response of the prime mover.

Here, the term "non-rigid coupling state" refers to a state wherein the engaging element such as a clutch or a brake, is not completely engaged. "Non-rigid coupling state" may also refer to a state when the engaging element is completely engaged, but another engaging element, such as a one-way clutch, a lock-up clutch of a torque converter, or a friction clutch of a manual transmission is not completely engaged.

In order to reduce the acceleration shock, an inverse filter as disclosed in Japanese Patent Laid-open Publication No. 2004-150388 proposes an inverse filtering (flattening treatment) of an engine demand torque provided by manipulation of the accelerator pedal to perform phase delay correction of the engine demand torque, thus relieving the rapid torque variation.

As the rapid variation of the engine demand torque is decreased, the variation in actual engine output torque is also decreased and the increase in engine RPM is suppressed by such an amount during completion of the engagement process of the engaging element in the transmission system disposed in the non-rigid coupling state between the engine and the wheels upon acceleration, thereby reducing the acceleration shock.

Conventional techniques merely decreases the variation of the engine demand torque by inverse filtering (i.e., a flattening treatment) of the engine demand torque. However, when inverse filtering is performed exceedingly, torque response characteristics (i.e., acceleration response) deteriorate until the engaging element is completely engaged, thereby resulting in reduced acceleration performance. In contrast, when inverse filtering (flattening treatment) is performed insufficiently, the amount of acceleration shock reduction is insufficient upon completion of the engagement process of the engaging element. Therefore, conventional techniques have difficulty achieving an optimal balance between acceleration shock reduction and a desired amount of acceleration response.

SUMMARY OF THE CLAIMED SUBJECT MATTER

In one aspect, the present disclosure relates to a vehicle control system including a prime mover, a power transmission apparatus disposed between the prime mover and at least one wheel, an engaging element configured to selectively engage and disengage the prime mover from the at least one wheel, and a torque limiter to restrict an output torque of the prime mover to a selected percentage in response to a transition of the prime mover between an unloaded state and a loaded state, wherein the torque limiter configured to restrict the output torque of the prime mover in response to a transition of the engaging element between non-rigid and rigid coupling states between the prime mover and the power transmission apparatus.

In another aspect, the present disclosure relates to a vehicle control system including a prime mover, a means for transmitting torque between the prime mover and at least one wheel, a means for selectively engaging and disengaging the prime mover from the at least one wheel, and a means for restricting an output torque of the prime mover to a selected percentage in response to a transition between an unloaded state and a loaded state, wherein the means for restricting configured to restrict the output torque of the prime mover in response to the means for selectively engaging is disengaged between the prime mover and the means for transmitting torque.

In another aspect, the present disclosure relates to a method to reduce acceleration shock in a vehicle power train including determining whether an engaging element between a prime mover and a power transmission apparatus is in transition between a fully engaged state and a fully disengaged state, limiting an output torque of the prime mover to a selected percentage when the engaging element is in transition between the fully engaged and the fully disengaged states, and returning the output torque to a demanded output torque at a return change rate when the engaging element is in a fully engaged state.

BRIEF DESCRIPTION OF DRAWINGS

Features of the present disclosure will become more apparent from the following description in conjunction with the accompanying drawings.

DETAILED DESCRIPTION

Embodiments of the present disclosure will be described in detail with reference to the accompanying drawings.

Figure 1:
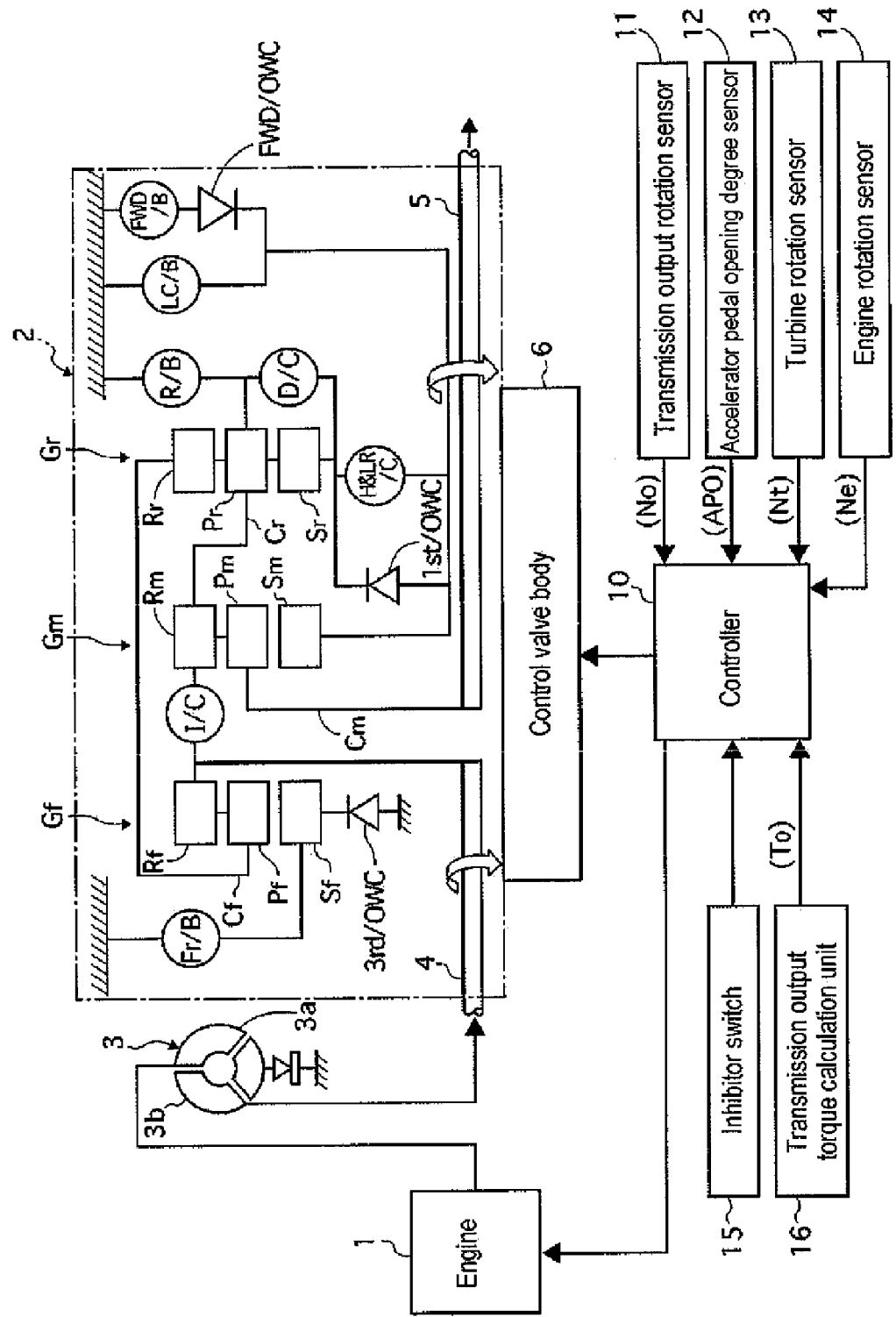
FIG. 1 is a system diagram illustrating a power train and a control system of a front engine rear wheel drive vehicle including an acceleration shock reduction apparatus according to an exemplary embodiment of the present disclosure.

FIG. 1 is a system diagram illustrating a power train and a control system of a front engine rear wheel drive vehicle including an acceleration shock reduction apparatus according to an exemplary embodiment of the present disclosure. Reference numeral 1 indicates an engine as a prime mover, reference numeral 2 indicates a step-type automatic transmission and reference numeral 3 indicates a torque converter.

Referring to FIG. 1, the power train of the vehicle includes the engine 1 and the automatic transmission 2 disposed in tandem at the rear side of the engine 1 in a forward-rearward direction, as in a typical rear-wheel drive vehicle.

Rotating power from the engine 1 may generally be transferred to an input shaft 4 of the automatic transmission 2 via the torque converter 3, which may serve to increase an output torque of the engine 1. Then, the automatic transmission 2 may shift the rotating power of the input shaft 4 in response to a selected shift stage and transfers the shifted rotating power to wheels (not shown) through an output shaft 5, thereby driving the vehicle.

Herein, the torque converter 3 may be a lock-up torque converter that sets a lock-up state between an input element 3a coupled to the engine 1 and an output element 3b coupled to the input shaft 4 of the transmission by means of a lock-up clutch (not shown) in a high rotation-low load driving state, which may not require the aforementioned torque increase.

The automatic transmission 2 may be the same as that disclosed in pages C-9 to C-22 of "Skyline New Car (CV35-type car) Service Manual," which was published by Nissan Motor Co., Ltd. in January 2003. The automatic transmission 2 may determine a transmission path (a selected shift stage) through engaging and releasing combinations of a plurality of frictional engaging elements (clutches or brakes) by selectively engaging and releasing the frictional engaging elements.

The input and output shafts 4 and 5 may be coaxially disposed to face each other. Between the shafts, there may be provided a front planetary gear set Gf, a middle planetary gear set Gm and a rear planetary gear set Gr, which are sequentially disposed from the torque converter 3 side to constitute main components of a planetary gear shift mechanism in the automatic transmission 2.

The front planetary gear set Gf, which is closer to the torque converter 3 than any other planetary gear sets, may be a simple planetary gear set that comprises a front sun gear Sf, a front ring gear Rf, a front pinion Pf engaging with the front sun and ring gears, and a front carrier Cf rotatably supporting the front pinion Pf.

The middle planetary gear set Gm, which is second closest to the torque converter 3, may be a simple planetary gear set that comprises a middle sun gear Sm, a middle ring gear Rm, a middle pinion Rm engaging with the middle sun and ring gears, and a middle carrier Cm rotatably supporting the middle pinion Pm.

The rear planetary gear set Gr, which is farther from the torque converter 3 than any other planetary gear sets, may be a simple planetary gear set that comprises a rear sun gear Sr, a rear ring gear Rr, a rear pinion Rr engaging with the rear sun and ring gears, and a rear carrier Cr rotatably supporting the rear pinion Pr.

The frictional engaging elements determining the transmission path (the selected shift stage) of the planetary gear shift mechanism may include a front brake Fr/B, an input clutch I/C, a high-and-low reverse clutch H&LR/C, a direct clutch D/C, a reverse brake R/B, a low-coast brake LC/B, a forward brake FWD/B and three one-way clutches (e.g., a third one-way clutch 3rd/OWC, a first one-way clutch 1st/OWC and a forward one-way clutch FWD/OWC), which may be connected to the components of the planetary gear sets Gf, Gm and Gr, thereby constituting the planetary gear shift mechanism of the automatic transmission 2.

The front ring gear Rf may be coupled to the input shaft 4. Further, the middle ring gear Rm may be suitably coupled to the input shaft 4 via the input clutch I/C.

The front sun gear Sf may be generally prevented by the third one-way clutch 3rd/OWC from rotating in an opposite direction to the rotating direction of the engine 1 and may be suitably secured by the front brake Fr/B disposed in parallel to the third one-way clutch 3rd/OWC.

The rear ring Rr may be coupled to a front carrier Cf and the middle ring gear Rm is coupled to a rear carrier Cr.

A middle carrier Cm may be coupled to the output shaft 5. Further, the middle sun gear Sm may be coupled to the rear sun gear Sr via the high-and-low reverse clutch H&LR/C while being prevented from rotating with respect to the rear sun gear Sr in an opposite direction to the rotating direction of the engine 1 via the first one-way clutch/OWC.

The rear sun gear Sr may be coupled to the rear carrier Cr via the direct clutch D/C, while the rear carrier Cr may be suitably secured by the reverse brake R/B.

The middle sun gear Sm may also be prevented by the forward brake FWD/B and the forward one-way clutch FWD/OWC from rotating in an opposite direction to the rotating direction of the engine 1 in an engaged state of the forward brake FWD/B. It may be suitably secured by the low coast brake LC/B, which is disposed in parallel to the forward brake FWD/B and the forward one-way clutch FWD/OWC.

Figures 2, 3:
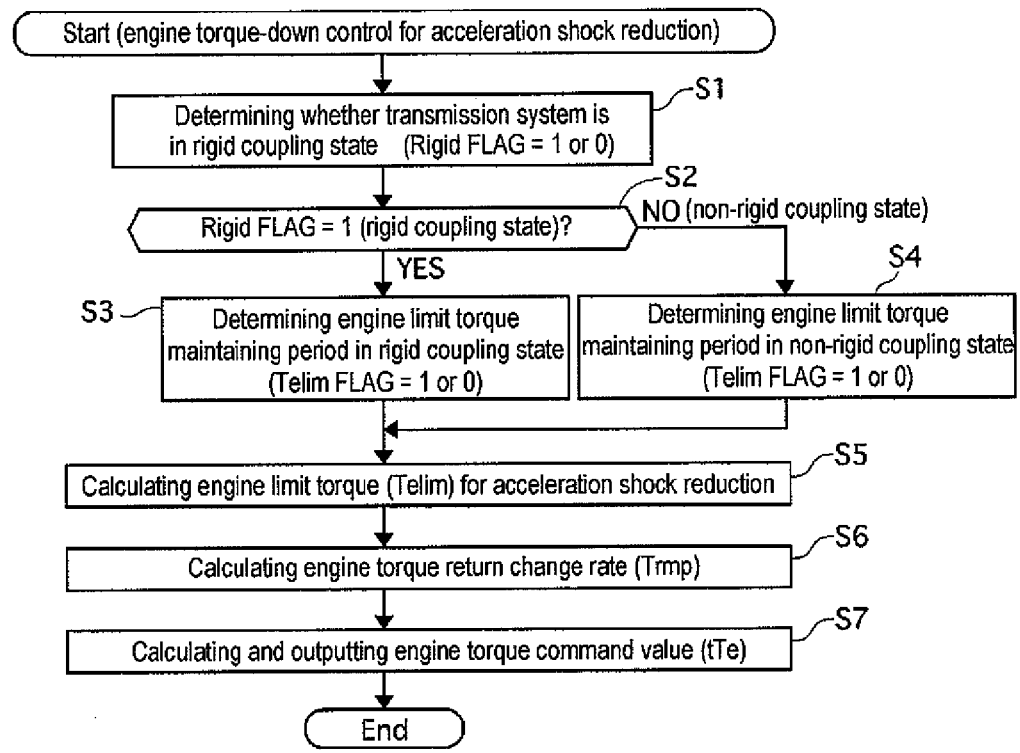
FIG. 2 is a logic diagram illustrating the relationship between engagement and releasing of a frictional engaging element and a selected shift stage in an automatic transmission mounted in the vehicle of FIG. 1.
FIG. 3 is a flowchart of a main routine of an engine torque-down process for acceleration shock reduction performed by a controller in FIG. 1.

Referring to FIG. 2, forward shift stages of a forward first shift position (1st shift), a forward second shift position (2nd shift), a forward third shift position (3rd shift), a forward fourth shift position (4th shift), a forward fifth shift position (5th shift) and a reverse shift stage (Reverse) are shown. The shift stages may be obtained by selective engagement and coupling of the seven frictional engaging elements (Fr/B, I/C, H&LR/C, D/C, R/B, LC/B, FWD/B) and the three one-way clutches (3rd/OWC, 1st/OWC, FWD/OWC), as indicated by open circle marks (○) and closed circle marks (●) in the respective power transmission modes of the planetary gear shift mechanism. Whereas the open circle mark (○) corresponds to engagement of the respective clutch or brake, the closed circle mark (●) corresponds to engagement of the clutch or brake only during use of the engine brake. For example, if the vehicle is accelerating, only open circle (○) marked elements (FWD/B, 1st/OWC, 3rd/OWC and FWD/OWC) are engaged. However if the vehicle is coasting with use of the engine brake, both open (○) and closed (●) circle marked and elements (H&LR/C, Fr/B, LC/B, FWD/B, 1st/OWC, 3rd/OWC and FWD/OWC) are engaged.

While automatic transmission 2 is described as a step-type automatic transmission in this embodiment, it should be understood that embodiments in accordance with the present disclosure may be applied to continuously variable transmissions, manual transmissions, or various other types of transmission. However, for example, in the case of a manual transmission, a friction clutch may be provided instead of the torque converter 3. Furthermore, for a manual transmission, it may also be possible to employ the automatic shift type manual transmission, whereby an automatic clutch is used instead of the torque converter 3, and which may perform an automatic shift operation of selective engagement mechanisms in the manual transmission.

Engagement logics of the frictional engaging elements (Fr/B, I/C, H&LR/C, D/C, R/B, LC/B, FWD/B) shown in FIG. 2 may be realized by means of a controller 10 shown in FIG. 1 via a control valve body 6. Further, the automatic transmission 2 may select a target shift stage commanded from the controller 10 with the engagement logics of the frictional engaging elements and coupling logics of the one-way clutches (3rd/OWC, 1st/OWC, FWD/OWC) as shown in FIG. 2. The controller 10 may additionally perform lock-up control of the torque converter 3 through the control valve body 6.

In selected embodiments, controller 10 may be an integrated controller commonly used for both shift control and engine control. Thus, controller 10 may perform not only control relating to the automatic transmission 2, but also fuel injection control (including fuel cutting control when coast traveling), ignition time control, and/or intake amount control (i.e., engine output control) of the engine 1. Further, the controller 10 may control engine output independent of the input requesting a demand torque corresponding to a driver's manipulation of an accelerator pedal during engine control.

For the shift control and the engine control, the controller 10 may be adapted to receive a signal from a transmission output rotation sensor 11 that detects an output shaft RPM (No) corresponding to an output RPM of the output shaft 5 of the automatic transmission 2, a signal from an accelerator pedal opening degree sensor 12 that detects an accelerator pedal opening degree (APO) (i.e., depression amount of the accelerator pedal), a signal from a turbine rotation sensor 13 that detects a turbine RPM (Nt) corresponding to an output RPM (transmission input RPM) of the torque converter 3, a signal from an engine rotation sensor 14 that detects an engine RPM (Ne) of engine 1, a signal from an inhibitor switch 15 that detects shift modes (selection ranges such as P, R, N, D and L ranges or the like) of the automatic transmission 2 selected by a driver, and a signal from a transmission output torque calculation unit 16 that calculates a transmission output torque (To).

Based on the above input information, the controller 10 may perform the shift control of the automatic transmission 2, the fuel injection control (including the fuel cutting control) of the engine 1, the ignition time control or the intake amount control (including an engine torque-down control for acceleration shock reduction as an object of the present disclosure described hereinafter in addition to the typical engine output control).

Next, the engine torque-down control for acceleration shock reduction as an object of the present disclosure will be described. In this control, the controller 10 may proceed with control programs shown in FIGS. 3 to 6, 9, 10, 14 and 17. FIG. 3 depicts a main routine for this control, while FIGS. 4 to 6, 9, 10, 14 and 17 depict subroutines of main routine FIG. 3.

Referring to FIG. 3, in step S1, the controller 10 determines whether a transmission system disposed between the engine 1 and wheels (not shown) is in a rigid coupling state, wherein power transmission is performed without passing through the one-way clutch after an engaging element (torque converter 3 or a frictional engaging element such as a clutch or a brake in the automatic transmission 2) is completely engaged. If the transmission system is in the rigid coupling state, then a rigid coupling flag Rigid FLAG is set to 1. If the transmission system is not in the rigid coupling state (that is, it is in a non-rigid coupling state), then the rigid coupling flag Rigid FLAG is set to 0.

Figure 4:
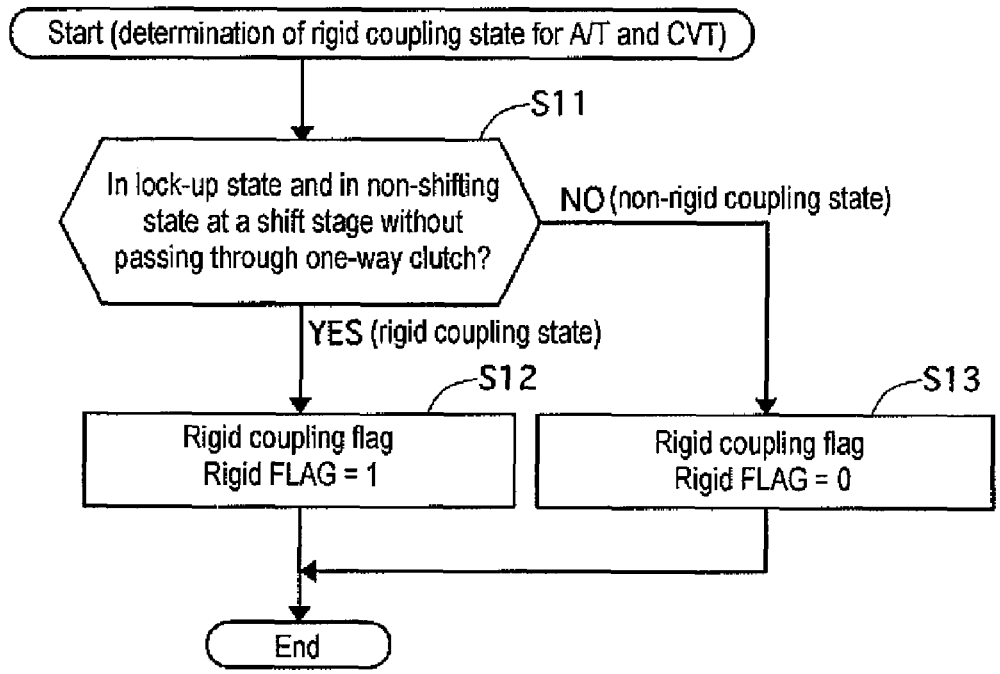
FIG. 4 is a flowchart of a subroutine of a process for determining a rigid coupling state in the main routine of FIG. 3.

Specifically, referring to FIG. 4 which shows a subroutine of rigid coupling determination for an automatic transmission A/T and a continuously various transmission CVT, in step S11, it is determined whether the transmission system is in the rigid coupling state by determining whether the torque converter 3 is in a lock-up state, whether the automatic transmission 2 is in a non-shifting state wherein the frictional engaging element is completely engaged under a current selection shift stage, and whether the current selection shift stage is a shift stage in which the power transmission is performed without passing through the one-way clutch.

If the torque converter 3 is in the lock-up state and the automatic transmission 2 is in the non-shifting state wherein the shift stage is maintained not to pass through the one-way clutch, then the transmission system is in the rigid coupling state and the rigid coupling flag Rigid FLAG is then set to 1 in step S12.

If the torque converter 3 is not in the lock-up state and the automatic transmission 2 is in a shifting state, then the transmission system is not in the rigid coupling state (non-rigid coupling state) and the rigid coupling flag Rigid FLAG is thus set to 0 in step S13.

Figure 5:
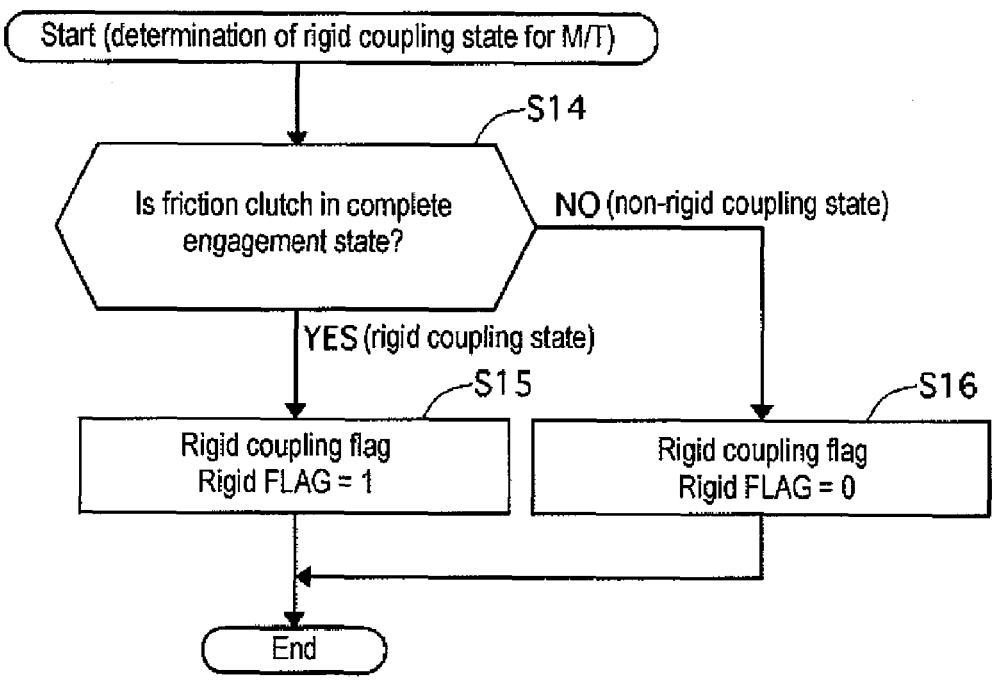
FIG. 5 is a flowchart of a subroutine of a process for determining the rigid coupling state in the main routine for a vehicle including a manual transmission instead of the automatic transmission as shown in FIG. 4.

When the manual transmission (including the automatic shift type manual transmission) is used instead of the automatic transmission 2, rigid coupling determination for the manual transmission M/T may be performed as shown in FIG. 5. That is, in step S14, it may be determined whether the transmission system is in the rigid coupling state according to whether a friction clutch used instead of the torque converter 3 is completely engaged (i.e., non-shifting state). Even if the friction clutch is completely engaged (in the non-shifting state), there may also be a case wherein the manual transmission does not have a shift stage where power transmission through the one-way clutch is performed. In this case, it may be determined that the transmission system is in the rigid-coupling state. Thus, the rigid coupling flag Rigid FLAG is set to 1 in step S15.

If the friction clutch is not completely engaged (not in the non-shifting state), then the transmission system is not in the rigid-coupling state. That is, the transmission system is in the non-rigid coupling state and the rigid coupling flag Rigid FLAG is thus set to 0 in step S16.

In step S2 in the main routine of FIG. 3, it is checked whether the rigid coupling flag Rigid FLAG is 1 or 0. If Rigid FLAG is 1, then the transmission system is determined to be in the rigid coupling state for acceleration shock reduction. Thus, the controller may proceed to step S3 where a control program as shown in FIG. 6 is performed to determine an engine limit torque maintaining period by setting a flag as follows.

Figure 6:
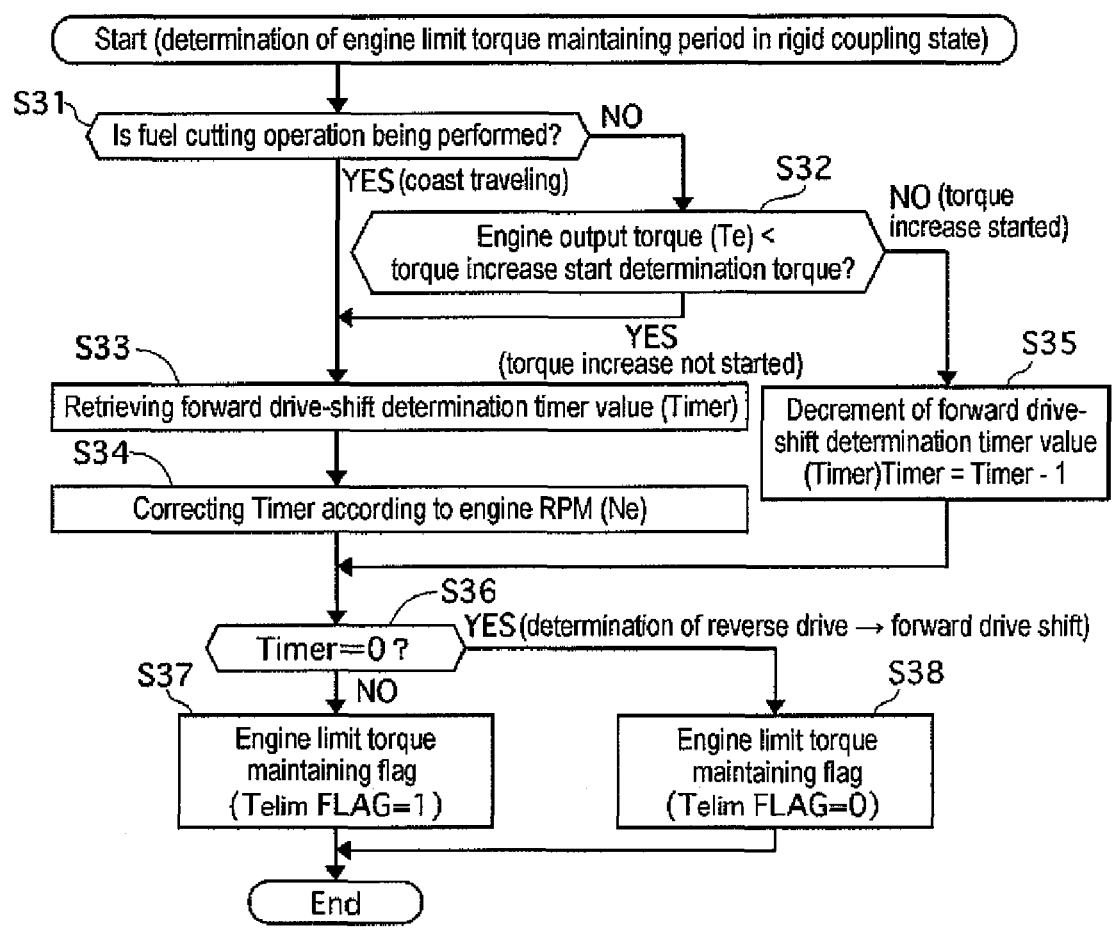
FIG. 6 is a flowchart of a subroutine of a process for determining an engine limit torque maintaining period in the rigid coupling state in the main routine of FIG. 3.

First, in step S31 of FIG. 6, it is determined whether the fuel cutting operation of the engine 1 is performed.

The fuel cutting operation is performed for the purpose of increasing fuel economy when coast traveling by releasing the accelerator pedal. This means that the engine is driven in an unloaded state by the driver and the transmission system is in a coast drive state (in an engine brake state wherein the engine 1 is driven by the wheels).

If it is determined in step S31 that the fuel cutting operation is not being performed, then it is determined in step S32 whether the engine 1 has started a torque increasing operation relating to manipulation of the accelerator pedal, depending on whether at least one of an engine output torque (Te) and an engine output estimation torque is less than a torque increase start determination torque. Here, the engine output torque Te may be obtained based on a demanded load of the engine 1 commanded by the driver via the accelerator pedal opening degree APO. Further, the engine output estimation torque may be estimated from an engine operation state such as engine intake, ignition time, fuel injection amount or the like.

Figure 7:
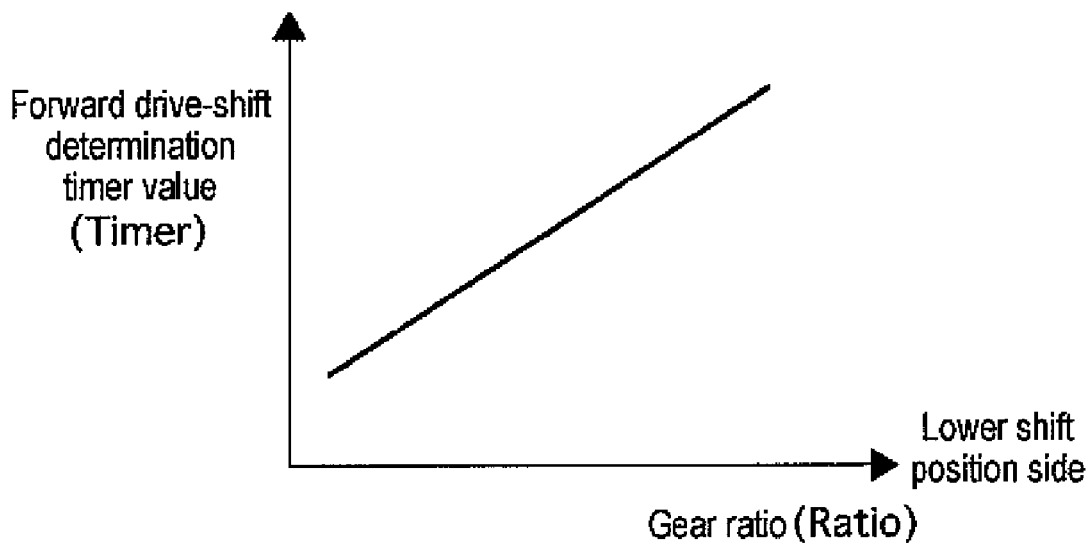
FIG. 7 is a graph depicting variation characteristics of a forward drive-shift determination timer value used for the process of determining the engine limit torque maintaining period in the rigid coupling state.

If it is determined in step S31 that the engine 1 is under the fuel cutting operation (in a coast traveling state) or if it is determined in step S32 that the engine output torque Te is less than the torque increase start determination torque (that is, the engine 1 has not started the torque increasing operation relating to manipulation of the accelerator pedal), then a forward drive-shift determination timer value Timer may be retrieved based on a gear ratio (selected shift stage) of the automatic transmission 2 using a map of FIG. 7 in step S33.

The forward drive-shift determination timer value Timer may be used to determine that shifting from the coast drive state to the forward drive state is performed, based on an elapsed time since determination in step S32 that the engine output torque Te is greater than or equal to the torque increase start determination torque (that is, the engine 1 has started the torque increasing operation relating to manipulation of the accelerator pedal).

Further, as shown in FIG. 7, as the gear ratio (i.e., the selected shift stage) of the automatic transmission 2 is varied to a lower shift position, the forward drive-shift determination timer value Timer may be increased. This is because a lower gear ratio may require a longer time for switching from the coast drive state to the forward drive state under acceleration.

Next, in step S34, the forward drive-shift determination timer value Timer may be corrected according to the engine RPM Ne. For this correction, a timer value correction coefficient Kne (wherein, 0<Kne<1) is obtained based on the engine RPM Ne using a map of FIG. 8 and is multiplied by the forward drive-shift determination timer value Timer.

Figure 8:
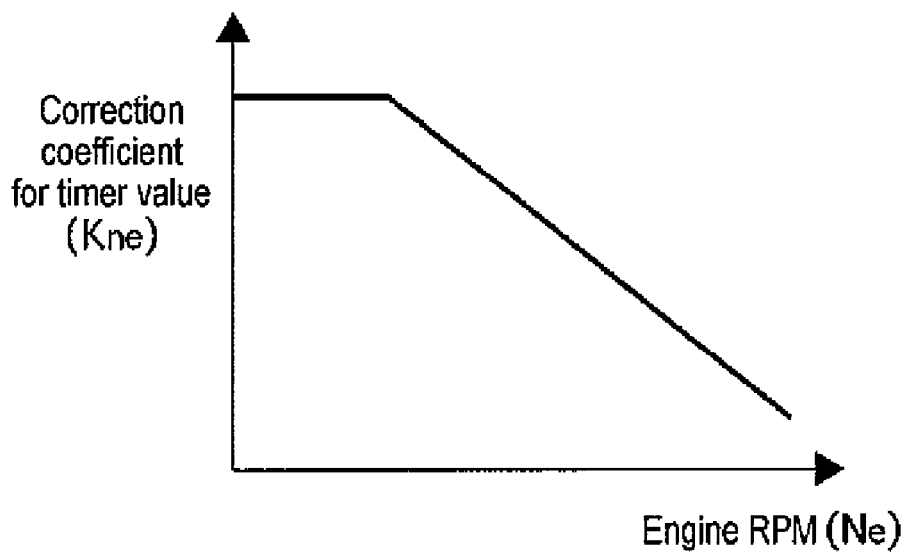
FIG. 8 is a graph depicting variation characteristics of a correction coefficient for the forward drive-shift determination timer value shown in FIG. 7.

Further, as shown in FIG. 8, the correction coefficient Kne may be set to decrease to a value less than 1 with increases of engine RPM Ne. Thus, the forward drive-shift determination timer value Timer may be corrected to decrease with increases in engine RPM Ne. This is because a higher engine RPM may require a shorter time to shift from the coast drive state to the forward drive state under acceleration.

If it is determined in step S32 that the engine output torque Te is greater than or equal to the torque increase start determination torque (i.e., the engine 1 has started the torque increasing operation relating to manipulation of the accelerator pedal), then the forward drive-shift determination timer value Timer may be decreased by 1 in step S35. The elapsed time since determination in step S32 that the engine output torque Te may be greater than or equal to the torque increase start determination torque (that is, the engine 1 has started the torque increasing operation relating to manipulation of the accelerator pedal) is estimated based on the forward drive-shift determination timer value Timer.

After step S34 or S35, it is determined in step S36 whether the forward drive-shift determination timer value Timer is 0. In other words, it is determined whether the elapsed time since determination in step S32 that the engine output torque Te is greater than or equal to the torque increase start determination torque (i.e., the engine 1 has started the torque increasing operation relating to manipulation of the accelerator pedal) has reached a prescribed time determined based on the forward drive-shift determination timer value Timer.

Figure 18:
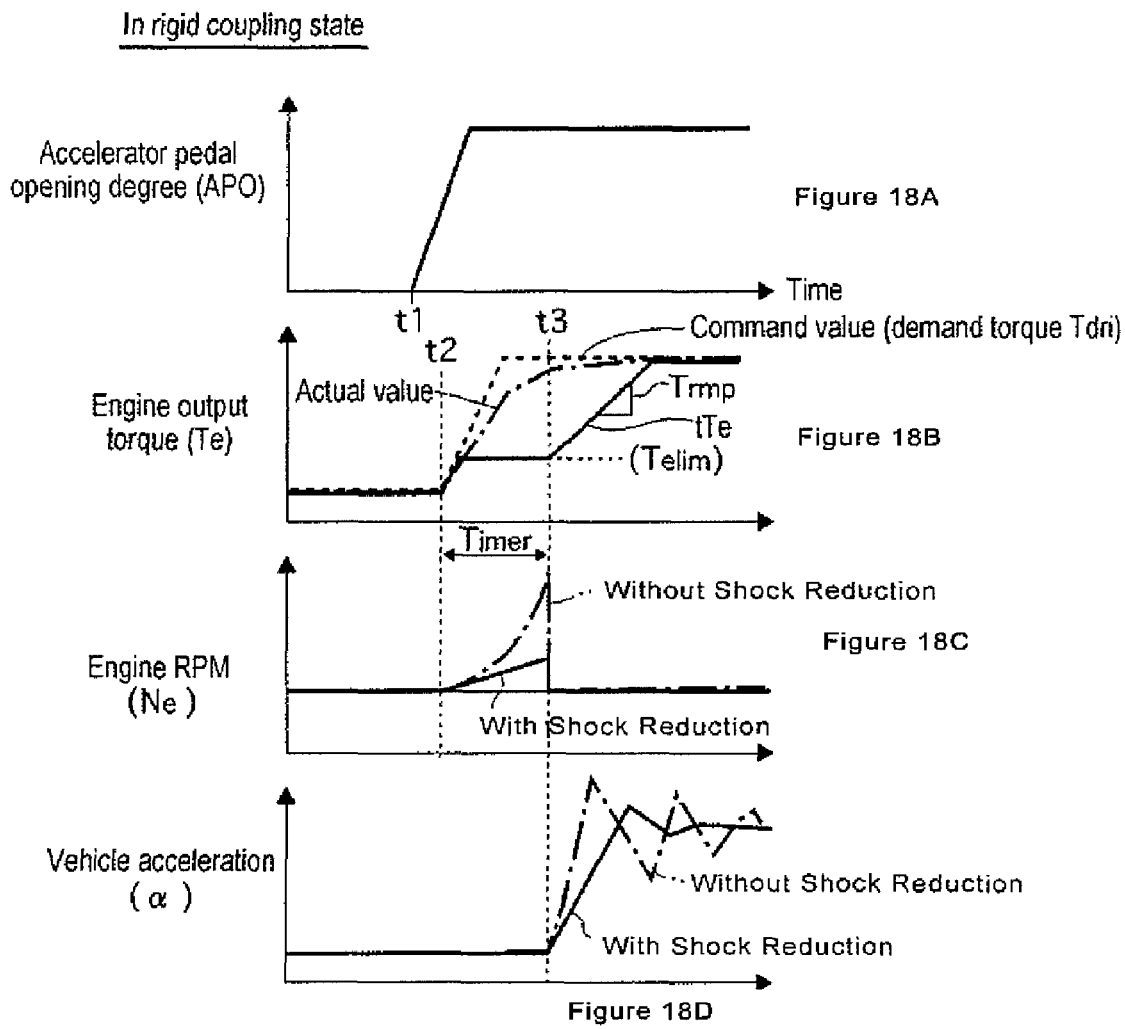
FIGS. 18A-D are time charts of an acceleration shock reducing operation performed by the embodiment shown in FIGS. 1 to 17, with a transmission system from an engine to wheels in a rigid coupling state.

Before determination in step S36 that the forward drive-shift determination timer value Timer is 0 (i.e., before a time point t3 when the prescribed time determined based on the forward drive-shift determination timer value Timer has elapsed from a time point t2 when the engine output torque Te becomes greater than or equal to the torque increase start determination torque—that is, the engine 1 has started the torque increasing operation relating to manipulation of the accelerator pedal) as shown in FIG. 18, an engine limit torque maintaining flag Telim FLAG is set to 1 in step S37. With this value, it is commanded that the current period is an engine limit torque maintaining period for acceleration shock reduction.

After determination in step S36 that the forward drive-shift determination timer value Timer is 0, i.e., after the time point t3 (after determining shift from the coast drive state to the forward drive state) when the prescribed time based on the forward drive-shift determination timer value Timer has elapsed from the time point t2 when the engine output torque Te becomes greater than or equal to the torque increase start determination torque (that is, the engine 1 has started the torque increasing operation relating to manipulation of the accelerator pedal) as shown in FIG. 18, the engine limit torque maintaining flag Telim FLAG is set to 0 in step S38. With this value, it may be commanded that the current period is not the engine limit torque maintaining period for acceleration shock reduction.

In step S2 of the main routine of FIG. 3, if it is determined that the rigid coupling flag Rigid FLAG is 0, then the transmission system is not in the rigid coupling state but in the non-rigid coupling state. Thus, the process proceeds to step S4 where a control program as shown in FIG. 9 may be performed to determine an engine limit torque maintaining period upon the non-rigid coupling for the acceleration shock reduction by setting a flag as follows.

Figure 9:
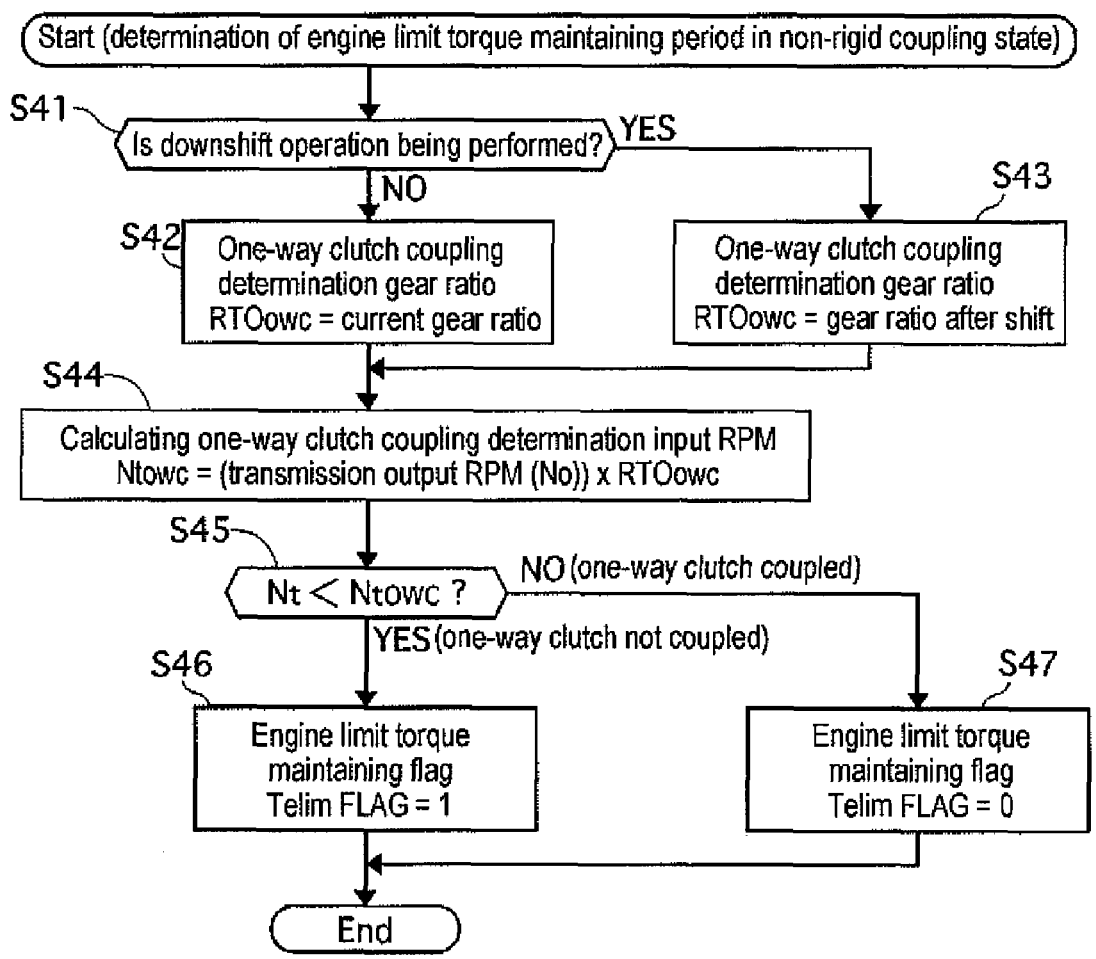
FIG. 9 is a flowchart of a subroutine of a process for determining an engine limit torque maintaining period in a non-rigid coupling state in the main routine of FIG. 3.
Figure 10:
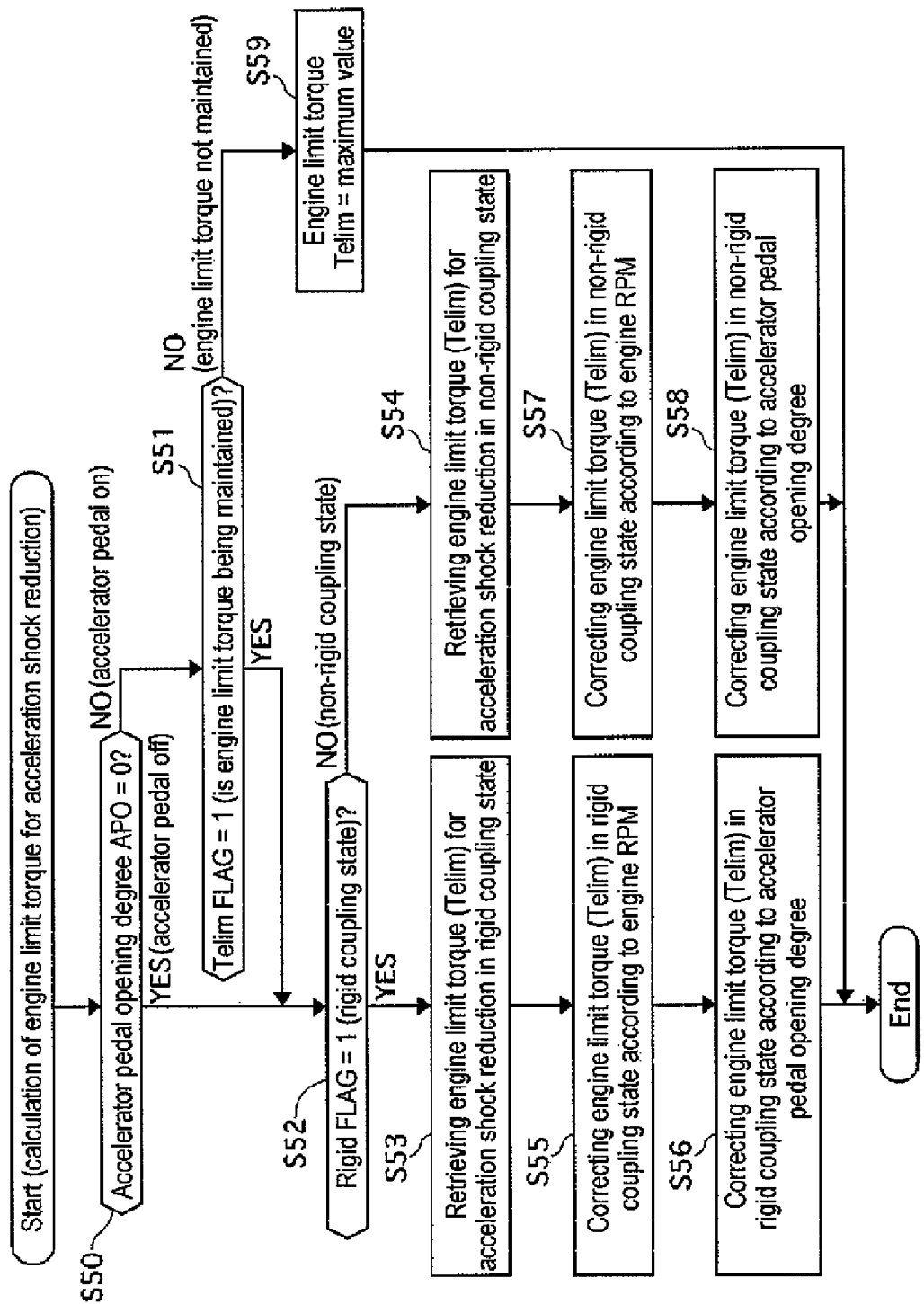
FIG. 10 is a flowchart of a subroutine of a process for calculating an engine limit torque for acceleration shock reduction in the main routine of FIG. 3.

In FIG. 9, two cases are exemplarily illustrated for convenience of description. In the first case, the automatic transmission 2 is in the non-rigid coupling state upon a downshift from the 3rd shift position to the 2nd shift position through coupling of the forward one-way clutch FWD/OWC by manipulating the frictional engaging elements to engage with the forward brake FWD/B while releasing the high-and-low reverse clutch H&LR/C as indicated by arrows of FIG. 2. In the second case, the automatic transmission 2 may be put into the third shift position before the downshift from the 3rd shift position to the 2nd shift position and is thus in the non-rigid coupling state where power transmission is performed through coupling of the third one-way clutch 3rd/OWC, as shown in FIG. 2.

In step S41 of FIG. 9, it is determined whether this downshift operation is being performed. If this downshift operation is not being performed, then a one-way clutch coupling determination gear ratio RTOowc relating to the third one-way clutch 3rd/OWC that is in the third shift position may be set to a current gear ratio (third shift position).

If the downshift operation is being performed, then the one-way clutch coupling determination gear ratio RTOowc relating to the forward one-way clutch FWD/OWC that is after the downshift from the 3rd shift position to the 2nd shift position may be set to a respective downshift gear ratio (i.e., second shift position) after the downshift.

In step S44, a one-way clutch coupling determination input RPM Ntowc is calculated by multiplying a transmission output RPM "No" by the one-way clutch coupling determination gear ratio RTOowc set in step S42 or step S43.

In step S45, it is determined whether a turbine RPM Nt as a transmission input RPM reaches the one-way clutch coupling determination input RPM Ntowc to determine whether coupling of the one-way clutch caused by manipulation of the accelerator pedal upon coast traveling is performed.

If it is determined in step S45 that Nt<Ntowc, that is, if it is determined that the one-way clutch is not coupled even by an increase in engine RPM via the manipulation of the accelerator pedal upon coast traveling, then the engine limit torque maintaining flag Telim FLAG is set to 1 in step S46. With this value, it may be determined that the current period is the engine limit torque maintaining period for acceleration shock reduction during which the engine output torque will be limited.

If it is determined in step S45 that Nt≧Ntowc, that is, if it is determined that the one-way clutch is coupled, and torque transmitting characteristics are abruptly changed by the increase of the engine RPM via the manipulation of the accelerator pedal upon coast traveling, then the engine limit torque maintaining flag Telim FLAG is set to 0 in step S47. With this value, it may be determined that the current period is not the engine limit torque maintaining period for acceleration shock reduction so the engine output torque will not be limited.

After determining the engine limit torque maintaining period for acceleration shock reduction by setting the flag in step S3 or S4 of the main routine of FIG. 3, In step S5 an engine limit torque Telim for acceleration shock reduction, which may be maintained during this period, is calculated. For this calculation, a control program of FIG. 10 may be performed to obtain the engine limit torque Telim for acceleration shock reduction.

First, in step S50, it is determined whether the vehicle is in an unloaded state (coast drive state) depending on whether the accelerator pedal opening degree APO is 0 wherein the accelerator pedal is released, or in a loaded state (forward drive state) depending on whether the accelerator pedal opening degree APO is greater than 0 wherein the accelerator pedal is depressed.

If the vehicle is determined to be in the loaded state (forward drive state), it is then determined at S51 whether it is in the engine limit torque maintaining period for acceleration shock reduction depending on whether the engine limit torque maintaining flag Telim FLAG is 1.

If it is determined in step S50 that the accelerator pedal opening degree APO is 0 (that is, in the unloaded state), then it may be determined in step S52 whether the transmission system is in the rigid coupling state or in the non-rigid coupling state, depending on whether the rigid coupling flag Rigid FLAG is 0 or 1. Here, even when the accelerator pedal opening degree APO>0 (that is, in the loaded state), if it is determined in step S51 that Telim FLAG=1 (that is, in the engine limit torque maintaining period for acceleration shock reduction), then step S52 is performed as mentioned above.

Figure 11:
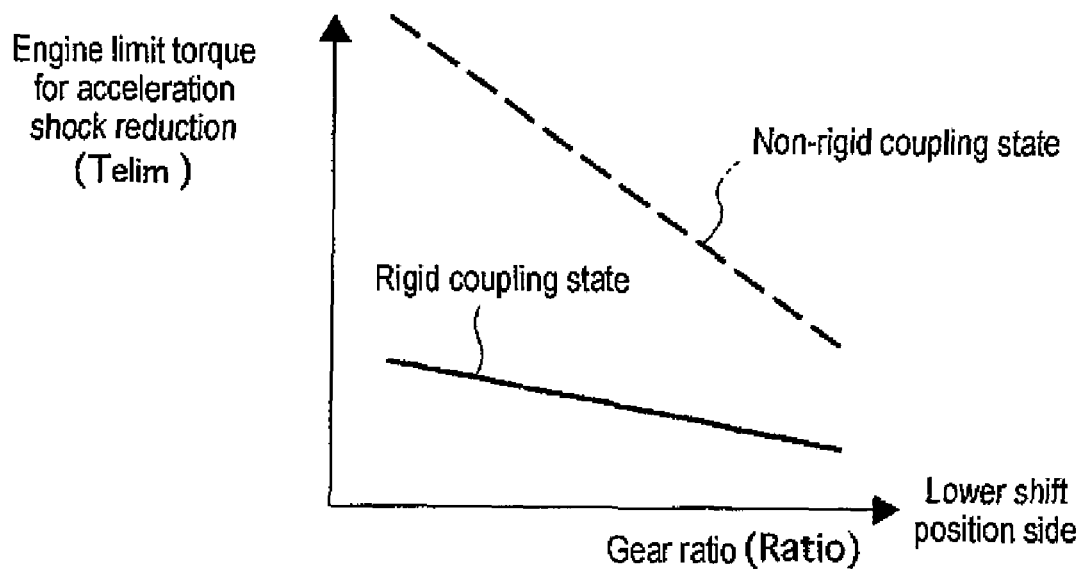
FIG. 11 is a graph depicting variation characteristics of the engine limit torque for acceleration shock reduction calculated by the process of FIG. 10.

If the transmission system is in the rigid coupling state, then the engine limit torque Telim for acceleration shock reduction in the rigid coupling state may be retrieved based on the gear ratio of the automatic transmission 2 using a map depicted by a solid line of FIG. 11 in step S53.

If the transmission system is in the non-rigid coupling state, then the engine limit torque Telim for acceleration shock reduction in the non-rigid coupling state may be obtained based on the gear ratio of the automatic transmission 2 using a map depicted by a dotted line of FIG. 11 in step S54.

As shown in FIG. 11, the engine limit torque Telim for acceleration shock reduction in the non-rigid coupling state may be set to be higher than the engine limit torque Telim for acceleration shock reduction in the rigid coupling state in the overall range of gear ratio Ratio. Here, acceleration shock in the rigid coupling state is greater than in the non-rigid coupling state. Hence, in order to ensure the acceleration shock reduction in the rigid coupling state, it may be necessary that the engine limit torque Telim for acceleration shock reduction in the rigid coupling state be set lower than in the non-rigid coupling state.

Because acceleration shock decreases with an increase of gear ratio Ratio to a higher shift ratio, it may be possible to increase both engine limit torques for acceleration shock reduction Telim in the rigid coupling state and in the non-rigid coupling state with the increase of gear ratio Ratio to the higher shift ratio. This trend may be more apparent in the non-rigid coupling state than in the rigid coupling state.

Figure 12:
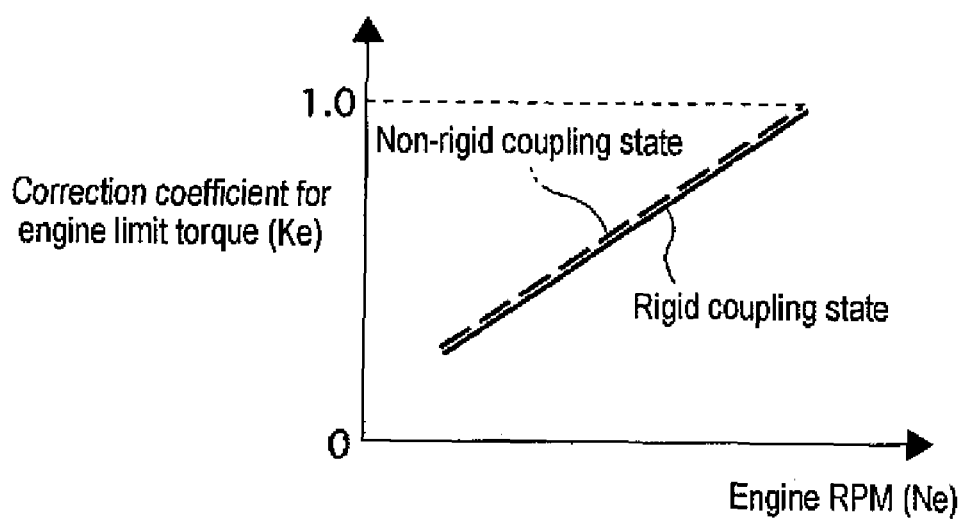
FIG. 12 is a graph depicting variation characteristics of a correction coefficient for the engine limit torque for acceleration shock reduction shown in FIG. 11.

As shown in FIG. 11, as the gear ratio Ratio increases to a higher shift ratio, both engine limit torques for acceleration shock reduction Telim in the rigid coupling state and in the non-rigid coupling state are increased. Additionally, a variation ratio of the engine limit torque Telim for acceleration shock reduction in the non-rigid coupling state to the gear ratio Ratio may be set to be greater than a variation ratio of the engine limit torque Telim for acceleration shock reduction in the rigid coupling state to the gear ratio Ratio In step S55, the engine limit torque Telim for acceleration shock reduction in the rigid coupling state obtained in step S54 may be corrected according to the engine RPM Ne. For this correction, a correction coefficient Ke obtained based on the engine RPM Ne using a map depicted by a solid line of FIG. 12 may be multiplied by the engine limit torque Telim for acceleration shock reduction in the rigid coupling state.

Figure 13:
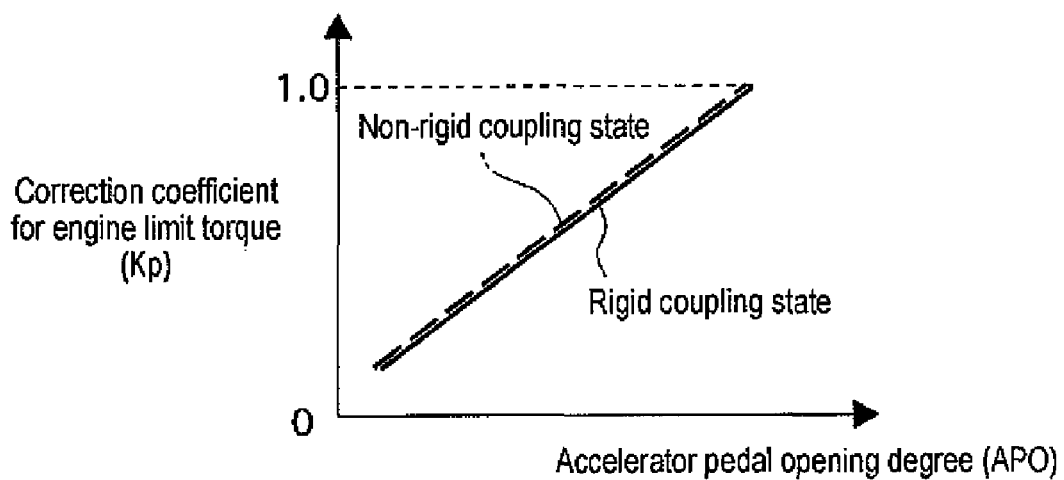
FIG. 13 is a graph depicting variation characteristics of another correction coefficient for the engine limit torque for acceleration shock reduction shown in FIG. 11.

In step S56, the corrected engine limit torque Telim for acceleration shock reduction in the rigid coupling state may further be corrected according to the accelerator pedal opening degree APO. For this correction, a correction coefficient Kp obtained based on the accelerator pedal opening degree APO using a map depicted by a solid line of FIG. 13 may be multiplied by the engine limit torque Telim for acceleration shock reduction in the rigid coupling state, which is corrected in step S55.

Because the decrease of the engine RPM Ne and the accelerator pedal opening degree APO may cause an increase of acceleration shock, it may be desired to decrease the engine limit torque for acceleration shock reduction as the engine RPM Ne and the accelerator pedal opening degree APO are reduced. As depicted by the solid lines of FIGS. 12 and 13, both correction coefficients (Ke, Kp) may decrease to (positive) values less than 1 with reductions in engine RPM Ne and accelerator pedal opening degree APO. Thus, the engine limit torque Telim for acceleration shock reduction in the rigid coupling state may be corrected to decrease with decreases of the engine RPM Ne and accelerator pedal opening degree APO.

In step S57, the engine limit torque Telim for acceleration shock reduction in the non-rigid coupling state obtained in step S54 may be corrected according to the engine RPM Ne. For this correction, a correction coefficient Ke obtained based on the engine RPM Ne using a map depicted by a dotted line of FIG. 12 may be multiplied by the engine limit torque Telim for acceleration shock reduction in the non-rigid coupling state.

In step S58, the corrected engine limit torque Telim for acceleration shock reduction in the non-rigid coupling state may further be corrected according to the accelerator pedal opening degree APO. For this correction, a correction coefficient Kp is obtained based on the accelerator pedal opening degree APO using a map depicted by a dotted line of FIG. 13 and may be multiplied by the engine limit torque Telim for acceleration shock reduction in the non-rigid coupling state corrected in step S57.

Because the decrease of the engine RPM Ne and the accelerator pedal opening degree APO may cause an increase of acceleration shock, it may be desired to decrease the engine limit torque for acceleration shock reduction as the engine RPM Ne and the accelerator pedal opening degree APO are reduced. As indicated by the dotted lines and solid lines of FIGS. 12 and 13, both correction coefficients (Ke, Kp) used in the non-rigid coupling state may be the same as those of the rigid coupling state and decrease to positive values less than 1 with reductions in engine RPM Ne and accelerator pedal opening degree APO. Thus, the engine limit torque Telim for acceleration shock reduction in the non-rigid coupling state may also be corrected to decrease with the decrease of the engine RPM Ne and the accelerator pedal opening degree APO.

If it is determined in step S51 that Telim FLAG is not 1 (i.e., not in the engine limit torque maintaining period for acceleration shock reduction), in step S59, the engine limit torque for acceleration shock reduction may be set to a maximum value that the engine 1 may output, thereby substantially preventing limitation of the engine torque for acceleration shock reduction (engine torque-down) from being performed.

Figure 14:
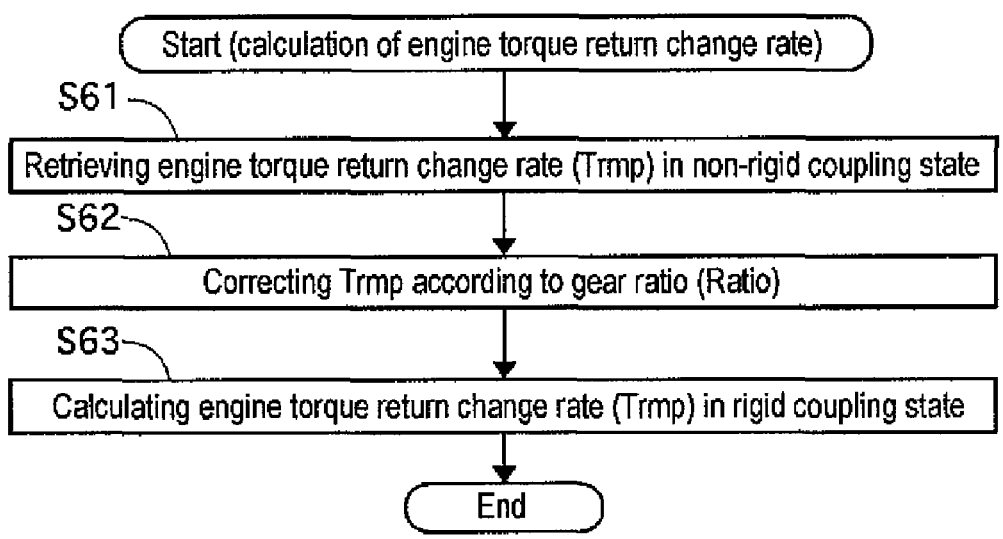
FIG. 14 is a flowchart of a subroutine for a process of calculating an engine torque return change rate in the main routine of FIG. 3.

In step S6 of the main routine of FIG. 3, an engine torque return change rate Trmp may be calculated as a change rate when returning the engine output torque Te from the engine limit torque Telim for acceleration shock reduction to an engine demand torque Tdri (see FIG. 18) corresponding to driver's manipulation of the accelerator pedal. For this calculation, as shown in FIG. 14, the engine torque return change rate Trmp in the non-rigid coupling state may first be retrieved based on the accelerator pedal opening degree APO and the engine RPM Ne using a map depicted by the dotted line of FIG. 15 in step S61.

Figure 16:
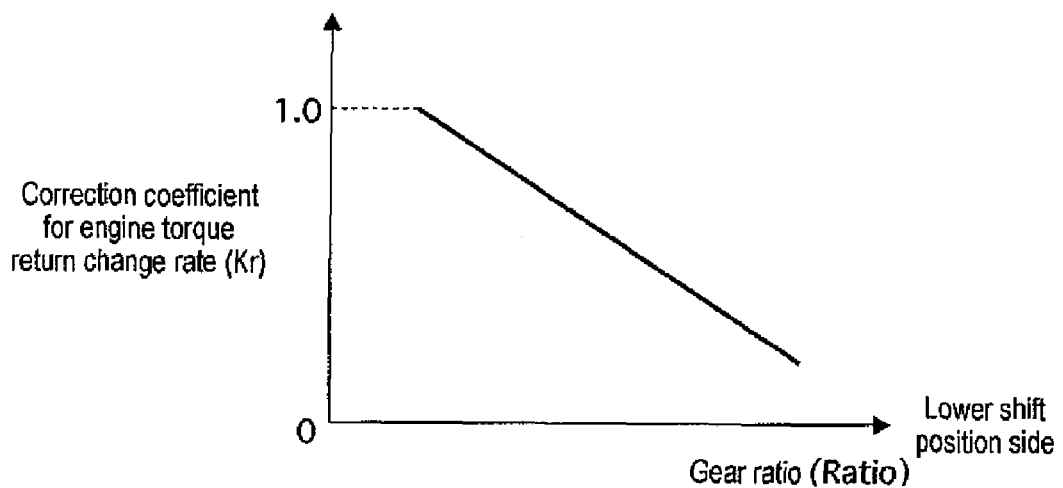
FIG. 16 is a graph depicting variation characteristics of a correct coefficient for the engine torque return change rate shown in FIG. 15.

Then, in step S62, the engine torque return change rate Trmp in the non-rigid coupling state may be corrected according to the gear ratio Ratio. For this correction, a correction coefficient Kr obtained based on the gear ratio Ratio using a map of FIG. 16 and may be multiplied by the engine torque return change rate Trmp in the non-rigid coupling state.

Figure 15:
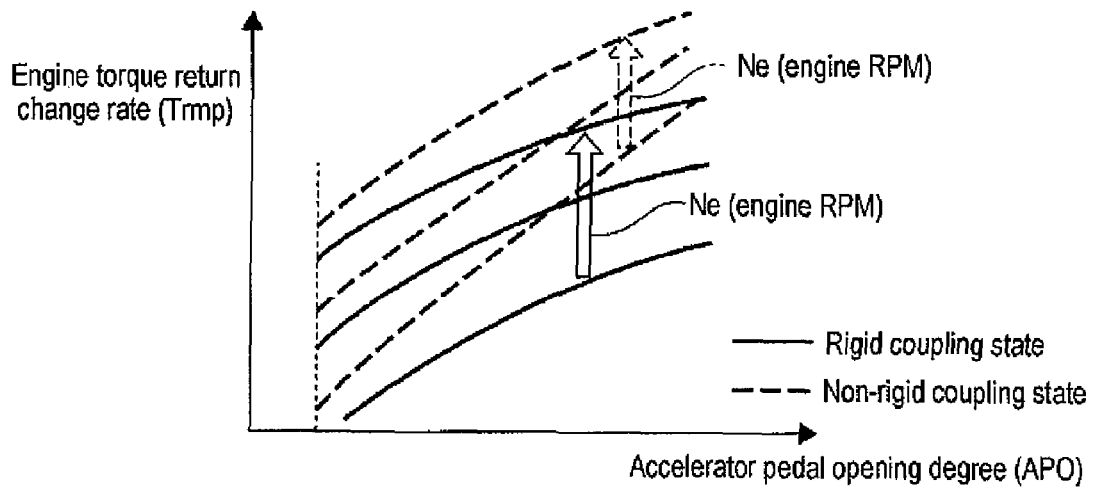
FIG. 15 is a graph depicting variation characteristics of the engine torque return change rate obtained by the process of FIG. 14.

In step S63, the engine torque return change rate Trmp in the rigid coupling state may obtained as depicted by a solid line of FIG. 15 by multiplying an engine torque return change rate conversion parameter in the rigid coupling state by the engine torque return change rate Trmp in the non-rigid coupling state.

At step S7 in the main route of FIG. 3, an engine torque command value tTe is calculated and applied to the engine. Further, output of the engine 1 may be controlled such that an output torque Te of the engine 1 is identical to the command value tTe. Calculation is performed based on the engine limit torques Telim for acceleration shock reduction in the rigid and non-rigid coupling states, the engine torque return change rates Trmp in the rigid and non-rigid coupling states, and the engine demand torque Tdri corresponding to driver's manipulation of the accelerator pedal.

Figure 17:
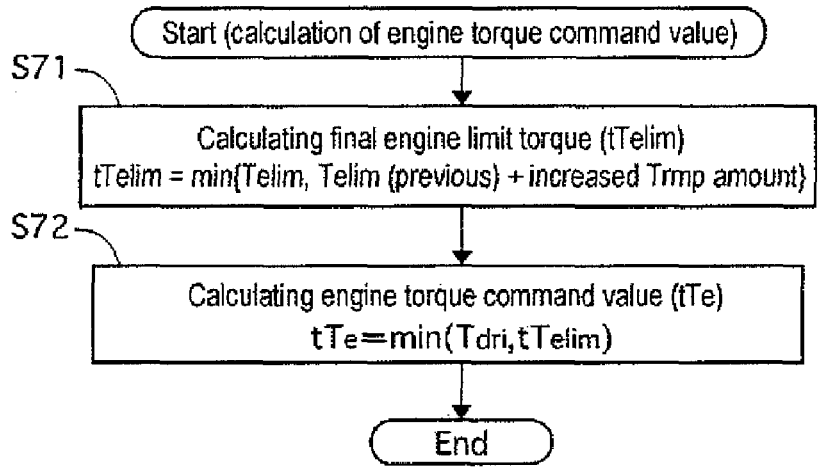
FIG. 17 is a flowchart of a subroutine of a process of calculating an engine torque command value in the main routine of FIG. 3.

In step S7, a control program of FIG. 17 is performed to calculate the engine torque command value tTe.

In step S71 of FIG. 17, a final engine limit torque tTelim may be calculated as follows. When the transmission system is in the non-rigid coupling state, the final engine limit torque tTelim in the non-rigid coupling state may be set to the lowest value between the engine limit torque Telim for acceleration shock reduction in the non-rigid coupling state and a value obtained by adding an increased Trmp amount relating to the engine torque return change rate Trmp in the non-rigid coupling state to the previous Telim Telim (previous) (i.e., min{Telim, Telim (previous)+increased Trmp amount}).

When the transmission system is in the rigid coupling state, the final engine limit torque tTelim in the rigid coupling state may be set to the lowest value between the engine limit torque Telim for acceleration shock reduction in the rigid coupling state and a value obtained by adding an increased Trmp amount relating to the engine torque return change rate Trmp in the rigid coupling state to the previous Telim Telim (previous) (i.e., min{Telim, Telim (previous)+increased Trmp amount}).

Next, in step S72, the engine demand torque Tdri corresponding to the driver's manipulation of the accelerator pedal, the final engine limit torque tTelim in the non-rigid coupling state and the final engine limit torque tTelim in the rigid coupling state may be compared to each other.

In the non-rigid coupling state, a lower value (i.e., min{Tdri, tTelim}) between the engine demand torque Tdri by the driver and the final engine limit torque tTelim in the non-rigid coupling state may be applied as the engine torque command value tTe to the engine 1. In the rigid coupling state, a lower value (i.e., min(Tdri, tTelim) between the engine demand torque Tdri by the driver and the final engine limit torque tTelim in the rigid coupling state may be applied as the engine torque command value tTe to the engine 1.

According to the above exemplary embodiment, if the transmission system disposed between the engine 1 and the wheels is in the rigid coupling state, (even in the case of acceleration with the engine demand torque Tdri increasing as depicted by a dotted line of FIG. 18), the engine torque command value tTe may be maintained at the engine limit torque Telim for acceleration shock reduction. Such a Telim would be less than the engine demand torque Tdri, (e.g., depicted by a solid line of FIG. 18), during shift from the coast drive state to the forward drive state from the time point t2 when the engine output torque Te becomes greater than or equal to the torque increase start determination torque (i.e., the engine 1 has started the torque increasing operation in response to manipulation of the accelerator pedal) to the forward drive determining time point t3 when the prescribed time based on the forward drive-shift determination timer value Timer has elapsed since the time point t2.

As a result, even with an engine exhibiting excellent torque response, the engine RPM Ne during shift from the coast drive state to the forward drive state by acceleration may not steeply increase as depicted by the dash dotted line, but instead may slightly increase in a gentle slope as depicted by the solid line. Thus, rattling caused by gear backlash in the transmission system disposed in the rigid coupling state between the engine and the wheels may be reduced. Accordingly, as should be appreciated from comparison between time-series variation of vehicle acceleration (α) of a vehicle in accordance with the present disclosure indicated by the solid line and a former vehicle indicated by the dash dotted line, the acceleration shock may be reduced upon completion of rattling reduction in the transmission system in the rigid coupling state.

Further, as shown in FIG. 18, during shift from the coast drive state to the forward drive state from the time point t2 to the forward drive determining time point t3 when the prescribed time determined by the forward drive-shift determination timer value Timer has elapsed from the time point t2, the engine limit torque maintaining period may be applied by setting the engine limit torque maintaining flag Telim FLAG to 1 as described in step S37. Additionally, engine torque-down control may be performed to maintain the engine torque command value tTe at the engine limit torque Telim for acceleration shock reduction less than the engine demand torque Tdri. As a result, the torque-down time may be determined independent of the torque-down amount. Specifically, the torque-down time relating to rattling reduction response and the torque-down amount relating to acceleration shock reduction upon completion of rattling reduction may be independently controlled, thereby ensuring an optimal balance between acceleration shock reduction and rattling reduction response.

Furthermore, according to selected embodiments of the present disclosure, as the gear ratio is varied to a lower shift position, the engine limit torque Telim for acceleration shock reduction may be lowered as indicated by the solid line of FIG. 11. At the same time, as the engine RPM Ne and the accelerator pedal opening degree APO (i.e., the demand load) are lowered, the engine limit torque Telim for acceleration shock reduction may be lowered by the correction coefficients (Ke, Kp) depicted by the solid lines of FIGS. 11 and 12. Hence, even in the case where the gear ratio Ratio remains higher because the engine RPM Ne and the acceleration pedal open degree APO are in different conditions, it may be possible to realize acceleration shock reduction as needed at any given time.

Further, as shown in FIG. 18, after the forward drive determining time point t3 when the prescribed time determined by the forward drive-shift determination timer value Timer has elapsed from the time point t2 where the engine output torque Te becomes greater than or equal to the torque increase start determination torque (i.e., engine 1 has started the torque increasing operation relating to manipulation of the accelerator pedal), the engine torque command value tTe may be increased at a predetermined time change rate Trmp from the engine limit torque Telim for acceleration shock reduction toward the engine demand torque Tdri. As a result, acceleration shock may not occur even when the engine output torque Te is returned from the engine limit torque Telim for acceleration shock reduction toward the engine demand torque Tdri after the forward drive determining time point t3.

Further, as the accelerator pedal opening degree APO (demand load) and the engine RPM Ne are increased, the engine torque return change rate Trmp slope may become more steep (i.e., the slope may increase) as depicted by the solid lines of FIG. 15. Additionally, as the gear ratio is varied to a lower shift position, the engine torque return change rate Trmp slope may become more gentle (i.e., the slope may decrease) by the correction coefficient Kr of FIG. 16. Hence, in any condition of gear ratio Ratio, engine RPM Ne and acceleration pedal open degree APO, it may be possible to ensure acceleration shock reduction when returning the engine torque.

Hereinafter, the advantageous effects of this exemplary embodiment in the case where the transmission system from the engine 1 to the wheels is in the non-rigid coupling state will be described with reference to FIG. 19.

Figure 19:
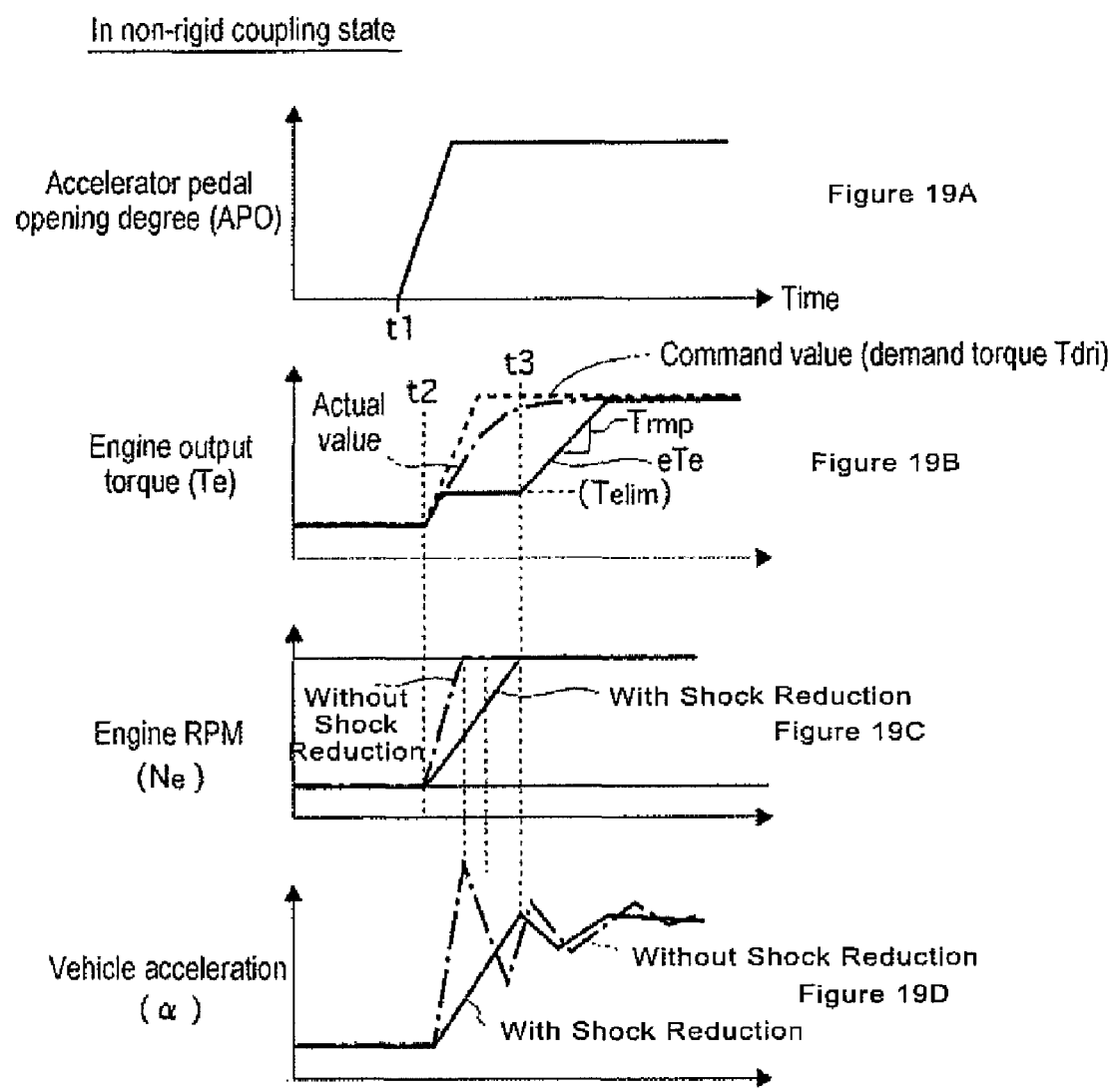
FIGS. 19A-D are time charts of an acceleration shock reducing operation performed by the embodiment shown in FIGS. 1 to 17, with the transmission system from the engine to the wheels in a non-rigid coupling state.

FIG. 19 shows operation time charts when depressing the accelerator pedal such that the accelerator pedal opening degree APO is increased with time-series variation from a time point t1 similar to FIG. 18.

In response to an increase in accelerator pedal opening degree APO, a command value of the engine output torque Te (i.e., engine demand torque Tdri) may increase as depicted by a dotted line from a time point t2 after a slight response lag from manipulation of the accelerator pedal, while an actual value of the engine output torque Te may increase to follow the command value, as depicted by a dash dotted line.

Meanwhile, in an engine exhibiting excellent torque response characteristics, the engine torque may steeply increase as indicated by the dash dotted line when the one-way clutch of the transmission system from the engine to the wheels in the non-rigid coupling state makes a short coupling stroke or when the frictional engaging element (including the lock-up clutch of the torque converter or the friction clutch for the manual transmission) is progressed from an unengaged or a slip state to a completely engaged state.

When the one-way clutch of the transmission system in the non-rigid coupling state is coupled or when the frictional engaging element (including the lock-up clutch or the friction clutch) is completely engaged, the rapid increase of the engine RPM Ne as indicated by the dash dotted line may cause substantial acceleration shock, as is clear from the time-series variation of the vehicle acceleration (α) indicated by the dash dotted line.

Further, according to the exemplary embodiment, even in the case of acceleration with the engine demand torque Tdri increasing as depicted by a dotted line of FIG. 19, the engine torque command value tTe may be maintained at the engine limit torque Telim for acceleration shock reduction, which may be less than the engine demand torque Tdri, as depicted by a solid line of FIG. 19, during drive state shifting before the time point t3 of determining rapid change in torque transfer characteristics by determining that the one-way clutch is coupled (step S45). As a result, even for the engine 1 exhibiting excellent torque response, the engine RPM Ne may not steeply increase as depicted by the dash dotted line. Rather, it may gently increase as indicated by the solid line during the drive state shift by acceleration, that is, when the one-way clutch of the transmission system disposed in the non-rigid coupling state between the engine and the wheels may make a short coupling stroke or when the frictional engaging element (including the lock-up clutch of the torque converter or the friction clutch for the manual transmission) is proceeded from an unengaged state or the slip state to the complete engagement state.

Accordingly, as may be appreciated from comparison between the time-series variation of vehicle acceleration α of a vehicle in accordance with the present disclosure indicated by the solid line and the conventional time-series variation of vehicle acceleration α of a former vehicle indicated by the dash dotted line, acceleration shock may be reduced when the one-way clutch of the transmission system in the non-rigid coupling state may make a short coupling stroke by acceleration or when the frictional engaging element (including the lock-up clutch of the torque converter or the friction clutch for the manual transmission) is proceeded from an unengaged state or the slip state to the complete engagement state.

Further, as shown in FIG. 19, during the drive state shift before the time point t3 of determining rapid change in torque transfer characteristics based on determination that the one-way clutch is coupled (step S45), the engine limit torque maintaining period for acceleration shock reduction is applied by setting the engine limit torque maintaining flag Telim FLAG to 1 in step S46. Additionally, as described above, the engine torque-down control may be performed to maintain the engine torque command value tTe at the engine limit torque Telim for acceleration shock reduction less than the engine demand torque Tdri. As a result, the torque-down time may be determined independent of the torque-down amount. Specifically, the torque-down time relating to one-way clutch coupling (acceleration response) (in the case of performing shift operation, shift response) and the torque-down amount relating to acceleration shock reduction upon the one-way clutch coupling may be independently controlled. This enables an optimal balance between acceleration shock reduction and one-way clutch coupling response.

Furthermore, according to selected embodiments, as the gear ratio is varied to a lower shift position, the engine limit torque Telim for acceleration shock reduction may be lowered as depicted by the solid line of FIG. 11. At the same time, as the engine RPM Ne and the accelerator pedal opening degree APO (i.e., demand load) are lowered, the engine limit torque Telim may also be lowered by the correction coefficients (Ke, Kp) as indicated by the solid lines of FIGS. 11 and 12. Hence, even in the case where the gear ratio Ratio, the engine RPM Ne and the accelerator pedal open degree APO are at different conditions, it may be possible to reduce acceleration shock as needed at any time.

Further, as shown in FIG. 19, after the time point t3 of determining the shift from the coast drive state to the forward drive state based on determination that the one-way clutch is coupled (step S45), the engine torque command value tTe may be increased at a predetermined time change rate Trmp from the engine limit torque Telim for acceleration shock reduction toward the engine demand torque Tdri. As a result, acceleration shock may not occur when the engine output torque Te is returned from the engine limit torque Telim for acceleration shock reduction toward the engine demand torque Tdri after the forward drive determining time point t3.

Further, as the accelerator pedal opening degree APO (i.e., the demand load) and the engine RPM are increased, the engine torque return change rate Trmp slope may become steeper (i.e., the slope may increase) as depicted by the solid lines of FIG. 15. Additionally, as the gear ratio is varied to a lower shift position, the engine torque return change rate Trmp slope may becomes more gentle (i.e., the slope may decrease) by the correction coefficient Kr of FIG. 16. Hence, even in any condition of gear ratio Ratio, engine RPM Ne and acceleration pedal open degree APO, it may be possible to ensure the acceleration shock reduction when returning the engine torque.

In the above exemplary embodiments, the one-way clutch is provided as an example of the engaging element of the transmission system in the non-rigid coupling state. Further, a steep change in torque transfer characteristics of the one-way clutch may be determined based on determination as to coupling of the one-way clutch in step S45 of FIG. 9. However, in a case where the lock-up clutch of the torque converter 3 is provided as the engaging element, a steep change in torque transfer characteristics by the engagement process of the lock-up clutch (engaging element) may be determined based on determination as to complete coupling of the lock-up clutch (engaging element).

Here, the determination as to complete coupling of the lock-up clutch (i.e., engaging element) may be made based on determination whether a difference value between the engine RPM Ne as the torque converter input RPM and the turbine RPM Nt as the torque converter output RPM is 0. Additionally, complete coupling of the lock-up clutch may be determined by detecting reversion of a slip direction of the torque converter 3 or by detecting abrupt change of torque amplification characteristics of the torque converter 3.

In a case where the transmission is not the automatic transmission 2 but a manual transmission coupled to the engine via the frictional clutch and where the engaging element is the frictional clutch, a steep change in torque transfer characteristics by engagement progress of the frictional clutch (engaging element) may be determined based on determination as to complete engagement of the frictional clutch (difference in RPM before and after the engagement=0).

Further, as described above, although the present disclosure has been described with reference to the automatic transmission 2, the transmission system (apparatus) may be the torque converter or the manual transmission.

Advantageously, selected embodiments of the present disclosure provide an acceleration shock reduction apparatus for vehicles that may separately control a torque-down amount relating to acceleration shock reduction and a torque-down time relating to acceleration response upon completion of the engagement process of the engaging element, thereby achieving an optimal balance between acceleration shock reduction and acceleration response.

Advantageously there may be provided an acceleration shock reduction apparatus for vehicles that may be driven by power transmitted from a prime mover to wheels via a transmission, wherein the prime mover may control output torque independent of a demand torque requested by an input corresponding to manipulation of an accelerator pedal by a driver. The apparatus may include an output torque limiter for maintaining an output torque of the prime mover at a predetermined value less than the demand torque until torque transfer characteristics of an engaging element, which is responsible for transmission and disconnection of power between the prime mover and the wheels, are abruptly varied by completion of an engagement process of the engaging element. The input requesting the amount of demand torque corresponds to the driver's manipulation of an accelerator pedal performed to shift the prime mover from an unloaded state to a loaded state, with a transmission system between the prime mover and the wheels being in a non-rigid coupling state in which the engaging element is not completely engaged.

Advantageously, torque-down time relating to acceleration response may correspond to the period of time when the engagement process of the engaging element in a non-rigid coupling state begins, until an abrupt change of the torque transfer characteristics would occur upon completion of the engagement process. Further, the torque-down amount relating to acceleration shock reduction may correspond to controlling the output torque of the prime mover to be maintained at a predetermined value which is less than the demand torque. The acceleration shock reduction apparatus disclosed herein may separately control the torque-down amount relating to the acceleration shock reduction and the torque-down time relating to the acceleration response. As a result, the acceleration shock reduction apparatus may achieve an optimal balance between acceleration shock reduction and acceleration response, thereby solving the problems of the conventional techniques.

Advantageously, embodiments the present disclosure include a control system configured to limit output torque of a prime mover as it is transitioned from an unloaded state to a loaded state. However, it should be understood that embodiments disclosed herein may also be applied to limiting output torque of a prime mover as it transitions from a loaded state to an unloaded state without departing from the scope of the claimed subject matter. Thus, the present disclosure includes a control system capable of limiting output torque of a prime mover as the prime mover changes between loaded and unloaded states, regardless of a direction of the change. Similarly, the present disclosure also includes control systems configured to limit output torque of a prime mover in response to a transition of an engaging element between rigid and non-rigid coupling states, regardless of a direction of the transition.

While the disclosure has been presented with respect to a limited number of exemplary embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. A vehicle control system, comprising:
    a prime mover;
    a power transmission apparatus disposed between the prime mover and at least one wheel;
    an engaging element configured to selectively engage and disengage the prime mover from the at least one wheel; and
    a torque limiter configured to restrict an output torque of the prime mover to a selected percentage in response to a transition of the prime mover between an unloaded state and a loaded state;
    the torque limiter configured to restrict the output torque of the prime mover in response to a transition of the engaging element between non-rigid and rigid coupling states between the prime mover and the power transmission apparatus,
    wherein the torque limiter is configured to restrict the output torque of the prime mover as a gear ratio of the power transmission apparatus is varied to a lower shift position.

2. The vehicle control system of claim 1, wherein the torque limiter is configured to restrict the output torque of the prime mover to the selected percentage when in transition from the unloaded state to the loaded state.

3. The vehicle control system of claim 2, wherein the torque limiter is configured to increase the selected percentage as the prime mover transitions from the unloaded state to the loaded state.

4. The vehicle control system of claim 1, further comprising a control unit to control the output torque of the prime mover to match a demanded output torque.

5. The vehicle control system of claim 1, wherein the torque limiter is configured to restrict the output torque over a selected time interval.

6. The vehicle control system of claim 1, wherein the torque limiter is configured to increase the selected percentage as RPM of the prime mover increases.

7. The vehicle control system of claim 1, wherein the selected percentage increases to 100% according to a predetermined time-variation gradient after torque transfer characteristics are varied as the engaging element transitions between engaged and disengaged positions.

8. The vehicle control system of claim 7, wherein the torque limiter is configured to increase a slope of the predetermined time variation gradient with an increase in a demanded output torque of the prime mover.

9. The vehicle control system of claim 7, wherein the torque limiter is configured to increase a slope of the predetermined time variation gradient with an increase in RPM of the prime mover.

10. The vehicle control system of claim 7, wherein the torque limiter is configured to decrease a slope of the predetermined time variation gradient as a gear ratio of the power transmission apparatus is varied to a lower shift position.

11. The vehicle control system of claim 1, wherein: the power transmission apparatus comprises at least one of an automatic transmission, a torque converter, and a manual transmission; and the engaging element comprises at least one of a one-way clutch, a lock-up clutch, and a friction clutch.

12. The vehicle control system of claim 11, wherein a variation of torque transfer characteristics by an engagement process of the engaging element is detected based on at least one of a coupling of the one-way clutch, a complete engagement of the lock-up clutch, and a complete engagement of the friction clutch.

13. The vehicle control system of claim 12, wherein determining the complete engagement of the lock-up clutch is performed by at least one of a reversion of a slip direction of a torque converter and a variation of torque amplification characteristics of the torque converter.

14. A vehicle control system, comprising:
    a prime mover;
    a means for transmitting torque between the prime mover and at least one wheel;
    an means for selectively engaging and disengaging the prime mover from the at least one wheel; and a means for restricting an output torque of the prime mover to a selected percentage in response to a transition between an unloaded state and a loaded state;

the means for restricting configured to restrict the output torque of the prime mover in response to the means for selectively engaging being disengaged between the prime mover and the means for transmitting torque, wherein the means for restricting an output torque of the prime mover is configured to restrict the output torque of the prime mover as a gear ratio of the means for transmitting torque is varied to a lower shift position.

15. The vehicle control system of claim 14, wherein the means for restricting is configured to increase the selected percentage when the prime mover is in transition between the unloaded state and the loaded state.

16. The vehicle control system of claim 14, wherein the selected percentage increases to 100% according to a predetermined time-variation gradient after torque transfer characteristics are varied as the means for selectively engaging transitions between engaged and disengaged positions.

* * * * *